(12) United States Patent
Takagi et al.

(10) Patent No.: US 6,934,125 B2
(45) Date of Patent: Aug. 23, 2005

(54) SUSPENSION FOR DISC DRIVE AND MANUFACTURING METHOD THEREFOR

(75) Inventors: Yasuji Takagi, Ebina (JP); Koji Uozumi, Isehara (JP); Masao Hanya, Yokohama (JP); Noriyuki Saito, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 57 days.

(21) Appl. No.: 10/732,699

(22) Filed: Dec. 9, 2003

(65) Prior Publication Data

US 2004/0120076 A1 Jun. 24, 2004

Related U.S. Application Data

(60) Division of application No. 09/793,410, filed on Feb. 26, 2001, now abandoned, which is a continuation-in-part of application No. 09/450,138, filed on Nov. 29, 1999, now abandoned.

(30) Foreign Application Priority Data

Sep. 17, 1999 (JP) .............................. 11-263705
Feb. 29, 2000 (JP) ...................... 2000-054097

(51) Int. Cl.$^7$ ............................................. G11B 5/48
(52) U.S. Cl. .................................................. 360/244.8
(58) Field of Search .................... 360/244.8, 244.9, 360/244.2, 244.3, 244.4

(56) References Cited

U.S. PATENT DOCUMENTS

| 4,167,765 A | 9/1979 | Watrous |
| 4,208,684 A | 6/1980 | Janssen et al. |
| 4,991,045 A | 2/1991 | Oberg |
| 5,936,803 A | 8/1999 | Berding |
| 6,005,750 A | 12/1999 | Willard et al. |
| 6,014,289 A | 1/2000 | Goss |
| 6,212,044 B1 | 4/2001 | Murakami et al. |
| 6,307,715 B1 | 10/2001 | Berding et al. |
| 2002/0051319 A1 | 5/2002 | Takagi et al. |

FOREIGN PATENT DOCUMENTS

| JP | 60-127578 | 7/1985 |
| JP | 02-049279 | 2/1990 |
| JP | 07-130025 | 5/1995 |
| JP | 08-102020 | 4/1996 |
| JP | 9-128919 | 5/1997 |
| JP | 9-191004 | 7/1997 |

OTHER PUBLICATIONS

Office Action dated Oct. 29, 2002 issued in counterpart Japanese Patent Application No. 2000–054097, filed Feb. 29, 2000; Inventors: Yasuji Takagi et al.

M. Hanya et al., "Suspension Design for Windage and High Bandwidth," (Treatise), Presented on Mar. 27, 2000, Japan.

*Primary Examiner*—Tianjie Chen
(74) *Attorney, Agent, or Firm*—Frishauf, Holtz, Goodman & Chick, P.C.

(57) ABSTRACT

A suspension for disc drive comprises a base plate, a load beam attached to the base plate, and a flexure attached to the load beam. The load beam includes a rigid body portion, formed of a thick plate independent of the base plate, and a spring portion, formed of a spring member in the form of a thin sheet independent of the rigid body portion. The spring member connects the rigid body portion and the base plate. The spring member is thinner than the rigid body portion and has a lower spring constant. The spring portion is more flexible than the rigid body portion.

2 Claims, 8 Drawing Sheets

SUSPENSION FOR DISC DRIVE AND MANUFACTURING METHOD THEREFOR

CROSS-REFERENCE TO RELATED APPLICATIONS

This is a Divisional Application of U.S. patent application Ser. No. 09/793,410 filed Feb. 26, 2001, abandoned which is a Continuation-in-Part application of U.S. patent application Ser. No. 09/450,138, filed Nov. 29, 1999 abandoned, the ontire contents of each of which are incorporated herein by reference.

This application is based upon and claims the benefit of priority from the prior Japanese Patent Applications No. 11-263705, filed Sep. 17, 1999; and No. 2000-054097, filed Feb. 29, 2000, the entire contents of which are incorporated herein by reference.

BACKGROUND OF THE INVENTION

The present invention relates to a suspension for disc drive incorporated in an information processing apparatus, such as a personal computer, and a manufacturing method therefor.

A hard disc drive (HDD) for recording on or retrieving information from a rotating magnetic disc or magneto-optical disc includes a carriage that can turn around a shaft. The carriage is turned around the shaft by means of a positioning motor.

As described in U.S. Pat. No. 4,167,765, for example, the carriage is provided with an arm, a suspension on the distal end portion of the arm, a head portion including a slider attached to the suspension, etc. When the slider is slightly lifted from the disc as the disc rotates at high speed, an air bearing is formed between the disc and the slider.

The suspension comprises a load beam formed of a precision thin plate spring, a flexure formed of a very thin plate spring that is fixed to the distal end portion of the load beam by laser welding or the like, and a base plate fixed to the proximal portion of the beam by laser welding or the like. The base plate is fixed to a suspension mounting surface of the arm.

In modern disc drives of this type, the density of information to be recorded tends to be enhanced, and the disc rotation has an inclination to higher speed. Accordingly, the suspensions for disc drive require a good vibration characteristic such that they can be positioned highly accurately with respect to the recording surface of discs. Further, the suspensions should not be easily influenced by air turbulence that is caused by high-speed rotation of the discs. To meet the demand for various new functions, moreover, the suspensions of this type also tend to be subjected to more complicated machining.

As the density of information to be stored in each disc increases, the suspensions are expected to have high stiffness and a low spring constant. FIG. 14 shows one such conventional suspension 1, which comprises a load beam 2 that integrally includes a rigid body portion 2a of length L1 and a spring portion 2b of length L2. Conventionally, therefore, the necessary performance (high stiffness) for the rigid body portion 2a and the performance (low spring constant) required by the spring portion 2b cannot be secured at the same time.

The material and thickness of the whole rigid body portion 2a, in particular, are inevitably restricted by the required properties of the spring portion 2b. In order to enhance the stiffness of the body portion 2a, therefore, it is necessary to form bent edges 3 by bending the opposite side edges of the rigid body portion 2a or to form ribs 4 by embossing. Accordingly, the load beam 2 must be subjected to high-accurately machining, thus entailing a lot of processes for machining, and therefore, high costs.

The bent edges 3 or ribs 4 on the load beam 2 may hinder a flow of air. When a disc rotates at high speed, therefore, the load beam 2 is easily influenced by air turbulence and flutters. A base plate 5 is fixed to the proximal portion of the load beam 2. Further, a flexure 6 is fixed to the distal end portion of the load beam 2. The flexure 6 is fitted with a slider 8 that constitutes a head portion 7.

In a load beam described in Jpn. Pat. Appln. KOKAI Publication No. 9-191004, for example, the thickness of a spring portion is partially reduced by partial etching in order to lower the spring constant of the load beam. Since the thickness of the spring portion cannot be accurately controlled by partial etching, however, it is unstable, so that the spring constant is liable to variation.

In the case of the suspension described in Jpn. Pat. Appln. KOKAI Publication No. 9-128919, a plurality of narrow plate spring portions are formed around a slider mounting portion of a load beam by etching or pressing. The plate spring portions are deformed in the thickness direction. In this prior art example, the plate spring portions should be formed in a narrow region on the distal end of the load beam. Therefore, the load beam requires very delicate machining, so that its shape and spring constant are liable to variation and its quality is unstable.

BRIEF SUMMARY OF THE INVENTION

Accordingly, the object of the present invention is to-provide a high-performance suspension for disc drive, capable of ensuring required performance, and a manufacturing method therefor.

In order to achieve the above object, a suspension for disc drive according to the present invention comprises a base plate, a load beam attached to the base plate, and a flexure attached to the load beam and adapted to be fitted with a head portion. In this suspension, the load beam includes a rigid body portion, independent of the base plate and fixedly fitted with the flexure, and a spring portion formed of a spring member formed independently of the rigid body portion, connecting the body portion and the base plate, and having a spring constant lower than that of the body portion.

In this suspension, the rigid body portion and the spring portion that constitute the load beam are separate components. In order to obtain the necessary performance for the suspension, therefore, suitable materials, thicknesses, etc. may be selected individually for the rigid body portion and the spring portion. For example, a thick plate is used for the rigid body portion of the load beam, while a high-accuracy spring member with a low spring constant, such as a thin rolled steel sheet is used for the spring portion.

For example, stainless steel may be used for the rigid body portion of the load beam. If the rigid body portion is formed of an alloy of a light metal (lighter than iron), such as a titanium or aluminum, or a synthetic resin, however, further reduction of weight and higher stiffness can be reconciled. Alternatively, the load beam and other structural components may be made of a laminated member made up of a light metal (e.g., aluminum-based metal, titanium, or the like) and a metal other than the light metal. Instead of the light metal, an alloy containing the light metal as its main ingredient may be used. The "laminated member" referred to in the present specification may be a clad member obtained by forcibly pressing different kinds of metals against one another, or an integral member obtained by bonding different kinds of metals together. In the present specification, the term "aluminum-based metal" is intended to cover not only an aluminum alloy but also pure aluminum. In this manner, the load beam or the arm-type long base plate is made of a laminated member, and this laminated member is formed of an aluminum-based metal, a Ti alloy, or a material containing at least two kinds of-light metal alloys. Accordingly, the load beam and/or other structural components is light in weight, and improved in frequency and vibration characteristics. It should be noted that the components may be homogenized by forming the flexure and the spring portion integrally with each other from one continuous metal plate.

According to the invention, the material and thickness of the rigid body portion that constitutes the load beam cannot be restricted by the spring portion of the load beam. Therefore, suitable materials and thicknesses may be selected individually for the rigid body portion and the spring portion to meet their respective requirements, so that the necessary performance for the suspension can be fulfilled. If the rigid body portion of the load beam is formed of a thick plate, for example, its stiffness can be further enhanced and air resistance against it can be reduced without forming bent edges or ribs on the load beam. Thus, the influence of air turbulence is lessened-when a disc rotates at high speed, and suspension fluttering can be restrained.

According to the suspension of the invention, the spring portion can enjoy a steady low spring constant, and high accuracy of the spring portion can be reconciled with the low spring constant. Since the rigid body portion of the load beam and the spring portion are separate components, the rigid body portion can be formed of a material softer than that of the spring portion. Thus, the rigid body portion can be formed with a higher degree of freedom of work, such as pressing.

Preferably, according to the invention, the rigid body portion of the load beam is formed of a light metal or synthetic resin. If the load beam is formed of a material with a low specific gravity, such as an aluminum or titanium alloy or synthetic resin, in this case, the load beam is reduced in weight, and its frequency and vibration characteristics are improved. By using the low-gravity material for both the load beam and the base plate, moreover, the whole suspension can be further reduced in weight, and the operation of the disc drive can be speeded up.

Preferably, moreover, the flexure and the spring portion are formed of one integral metal sheet. With this arrangement, the number of components that constitute the suspension can be reduced, and the accuracy of relative positioning of the flexure and the spring portion can be improved.

A method for manufacturing a suspension according to the invention uses a semi-finished suspension product, which integrally includes a base plate, a rigid body portion of a load beam, and a pair of connecting portions connecting the base plate and the rigid body portion. The method also uses a spring member that is formed independently of the semi-finished suspension product. The distance between the connecting portions of the semi-finished product is greater than the width of the spring member. After the spring member is fixed to the base plate and the rigid body portion of the semi-finished product, the connecting portions, which project individually from the opposite sides of the spring member, are cut off from the base plate and the rigid body portion. According to this manufacturing method, the base plate and the rigid body portion can be handled as one body in some preceding processes for manufacturing the suspension. Thus, a common material can be used for the base plate and the rigid body portion, so that the number of components used in the suspension can be reduced, and the base plate and the rigid body portion can be positioned with higher accuracy as the spring member is fixed to them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
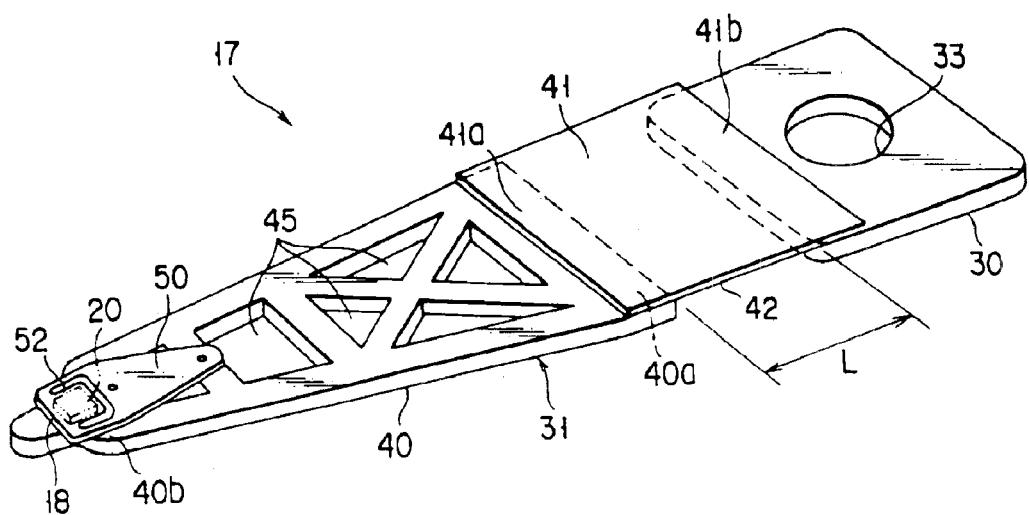
FIG. 1 is a perspective view of a suspension for disc drive according to a first embodiment of the present invention.

A first embodiment of the present invention will now be described with reference to FIGS. 1 to 3. A hard disc drive (HDD) 10 shown in FIG. 3 includes a carriage 12 that can turn around a shaft 11. The carriage 12 is turned around the shaft 11 by means of a positioning motor 13 such as a voice coil motor.

The carriage 12 is provided with a plurality of arms (actuator arms) 16, suspensions 17 mounted individually on the respective distal end portions of the arms 16, head portions 18 provided individually on the respective distal end portions of the suspensions 17, etc. When the carriage 12 is actuated by the motor 13, each head portion 18 moves to a desired track of its corresponding disc 19.

Each head portion 18 includes a slider 20, which is situated in a position such that it can face the tracks of the disc 19, a transducer (not shown) held thereon, etc. When the disc 19 rotates at high speed, the slider 20 is slightly lifted from the disc 19 by air between the two members, whereupon an air bearing is formed between the disc 19 and the slider 20.

As shown in FIG. 1, each suspension 17 includes a base plate 30, a load beam 31 attached to the plate 30, etc. As shown in FIG. 3, the base plate 30 is fixed to its corresponding arm 16. The base plate 30 is formed having a circular hole 33 into which a boss portion (not shown) of the arm 16 is to be inserted.

Figure 2:
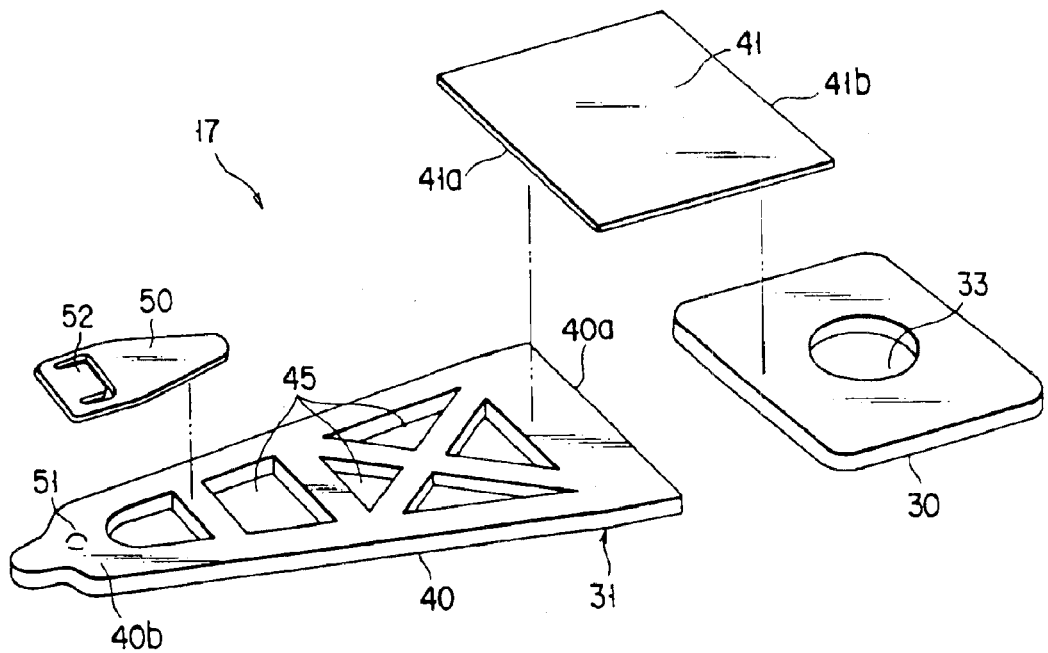
FIG. 2 is an exploded perspective view of the suspension shown in FIG. 1.
Figure 3:
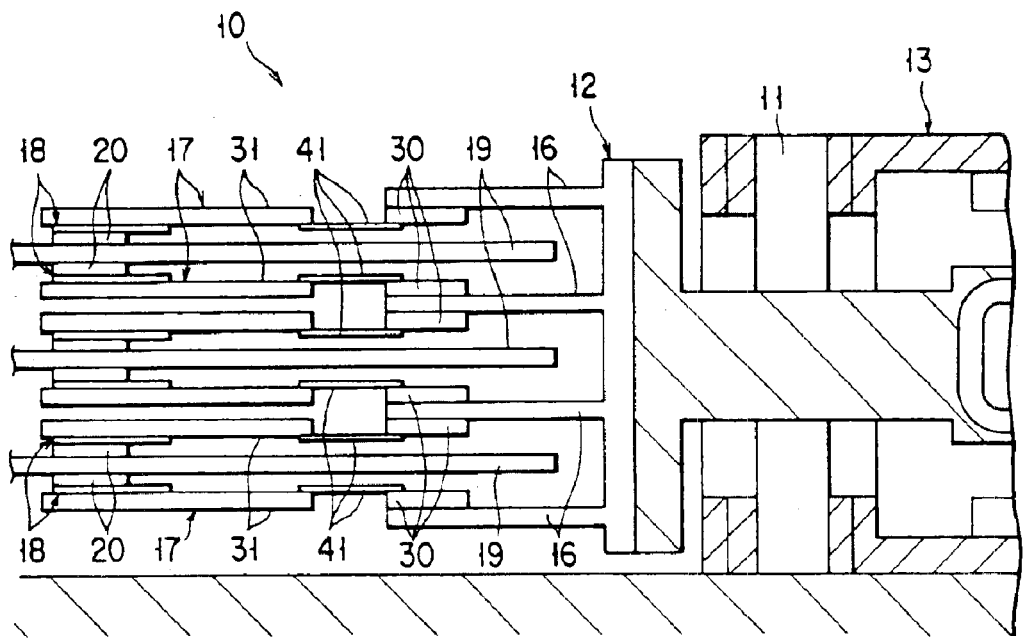
FIG. 3 is a side view, partially in section, showing a hard disc drive provided with the suspension shown in FIG. 1.

As shown in FIG. 2, each load beam 31 is provided with a rigid body portion 40, which is independent of the base plate 30, and a spring portion 42 formed of a spring member 41 fixed to the body portion 40. The rigid body portion 40 is thicker than the spring member 41. That portion of the spring member 41 which corresponds to length L in FIG. 1 is a region that functions as the spring portion 42. The spring portion 42 has a spring constant smaller than that of the body portion 40, and therefore, is more flexible. To reconcile lightweight and high stiffness, the illustrated body portion 40 is formed of a light alloy, such as an aluminum alloy, and is penetrated by apertures 45 in the thickness direction.

The apertures 45 may be replaced with recesses that are formed by partially reducing the thickness of the rigid body portion 40 by, for example, etching. A light metal (lower in specific gravity than iron), such as a titanium or aluminum alloy, or a synthetic resin may be used when forming the load beam 31. To be specific, the load beam 31 may be made of a laminated member made up of an Al alloy plate and a stainless steel plate. With use of one such low-gravity material, the load beam 31 can be reduced in weight, and its frequency and vibration characteristics can be improved. If necessary, the load beam 31 may be subjected to bending.

The plate-like spring member 41 that constitutes the spring portion 42 is formed of a springy rolled stainless-steel sheet, for example. One end portion 41a of the spring member 41 is put on and fixed to an end portion 40a of the rigid body portion 40 by laser welding or the like. The other end portion 41b of the spring member 41 is put on and fixed to the base plate 30 by laser welding or the like.

The spring member 41 may be fixed to the rigid body portion 40 of the load beam 31 with use of an adhesive in place of welding. In the case where the body portion 40 is formed of a synthetic resin, the spring member 41 may be fixed to it by the so-called in-mold forming. In this in-mold forming, the spring member 41 is set in a mold for molding the rigid body portion 40, and a resin material is poured into the mold in this state and cured.

A flexure 50, a very thin plate spring, is attached to the rigid body portion 40. The flexure 50, which is formed of a rolled stainless-steel sheet, for example, is fixed to the load beam 31 by laser welding or the like. As shown in FIG. 2, a protuberance 51 is provided on an end portion 40b of the body portion 40. The protuberance 51 is in contact with a tongue portion 52 of the flexure 50. The protuberance 51 projects toward the tongue portion 52. The slider 20, which constitutes each head portion 18, is mounted on the flexure 50.

In the suspension 17 constructed in this manner, the rigid body portion 40 and the spring portion 42 that constitute each load beam 31 are separate components. Suitable materials and thicknesses may be selected individually for the body portion 40 and the spring portion 42. Accordingly, it is easy to reconcile the necessary performance (e.g., high stiffness) for the body portion 40 and the required performance (e.g., low spring constant) for the spring portion 42. Since a high-accuracy rolled sheet is used for the spring member 41, moreover, the spring portion 42 can enjoy a steady low spring constant.

Figure 14:
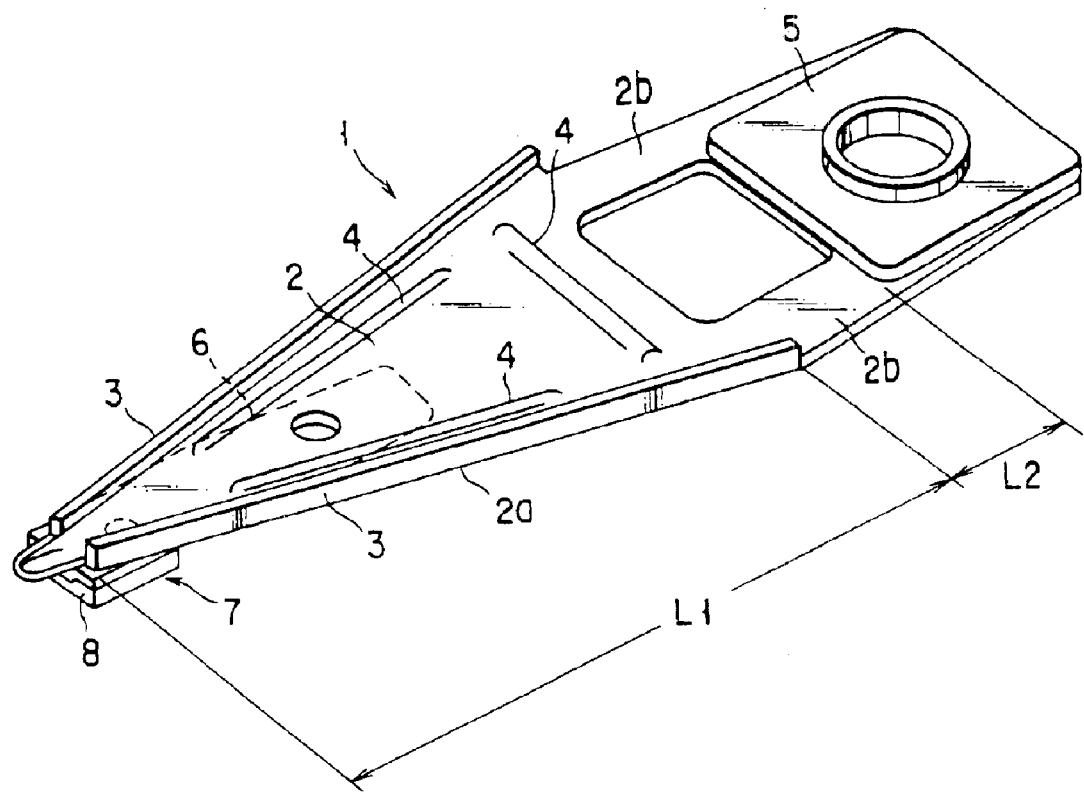
FIG. 14 is a perspective view of a conventional disc-drive suspension.

A thick plate can be used for the load beam 31 according to this embodiment. As compared with the prior art example of FIG. 14 that is provided with the bent edges and ribs, therefore, the load beam 31 can be shaped so that it cannot easily disturb a flow of air, and stiffness of the load beam 31 is enhanced. Thus, the influence of air turbulence is lessened even though the disc rotates at high speed.

Figure 4:
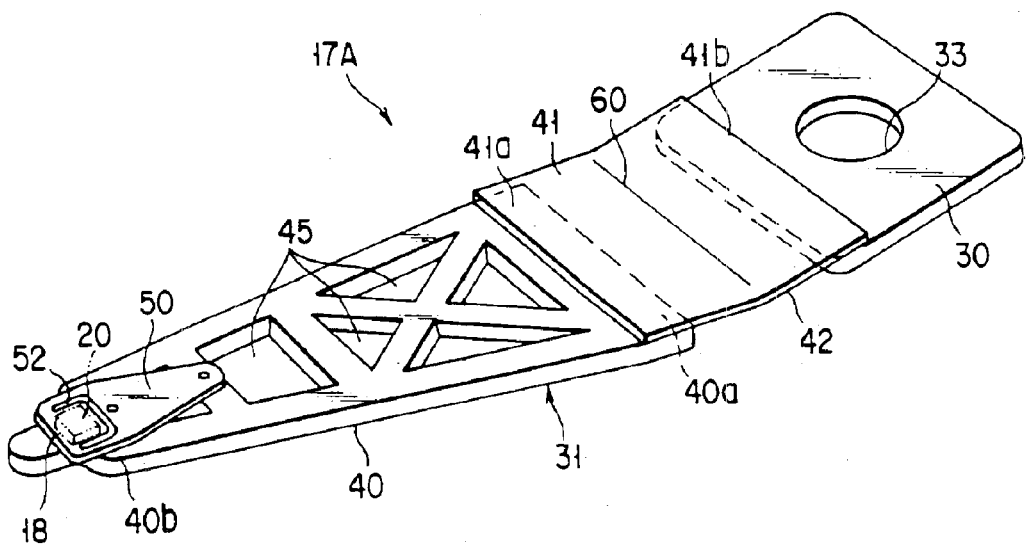
FIG. 4 is a perspective view of a suspension for disc drive according to a second embodiment of the invention.

FIG. 4 shows a suspension 17A according to a second embodiment of the invention. A spring portion 42 of the suspension 17A includes bent portions 60, which are formed by bending the longitudinally intermediate portion of a spring member 41. For other arrangements, the suspension 17A resembles the suspension 17 according to the first embodiment, so that common reference numerals are used to designate portions that are common to the first and second embodiments, and a description of those portions is omitted.

Figure 5:
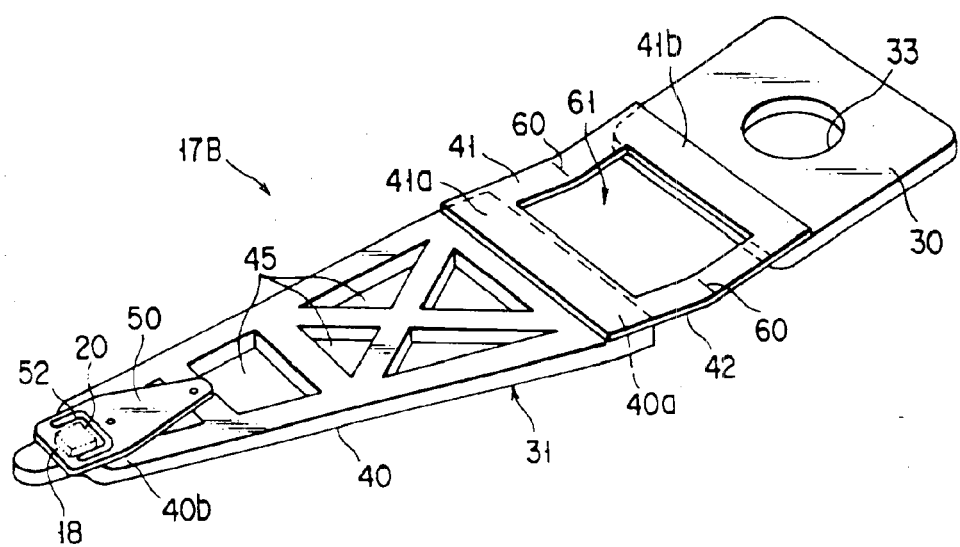
FIG. 5 is a perspective view of a suspension for disc drive according to a third embodiment of the invention.

FIG. 5 shows a suspension 17B according to a third embodiment of the invention. The suspension 17B has an aperture 61 formed in the central portion of a spring member 41. The opposite sides of the aperture 61 of the spring member 41 serves as a spring portion 42 with a low spring constant. Bent portions 60 are formed by partially bending the spring member 41. For other arrangements, the third embodiment resembles the first embodiment, so that common reference numerals are used to designate portions that are common to the first and third embodiments, and a description of those portions is omitted.

Figure 6:
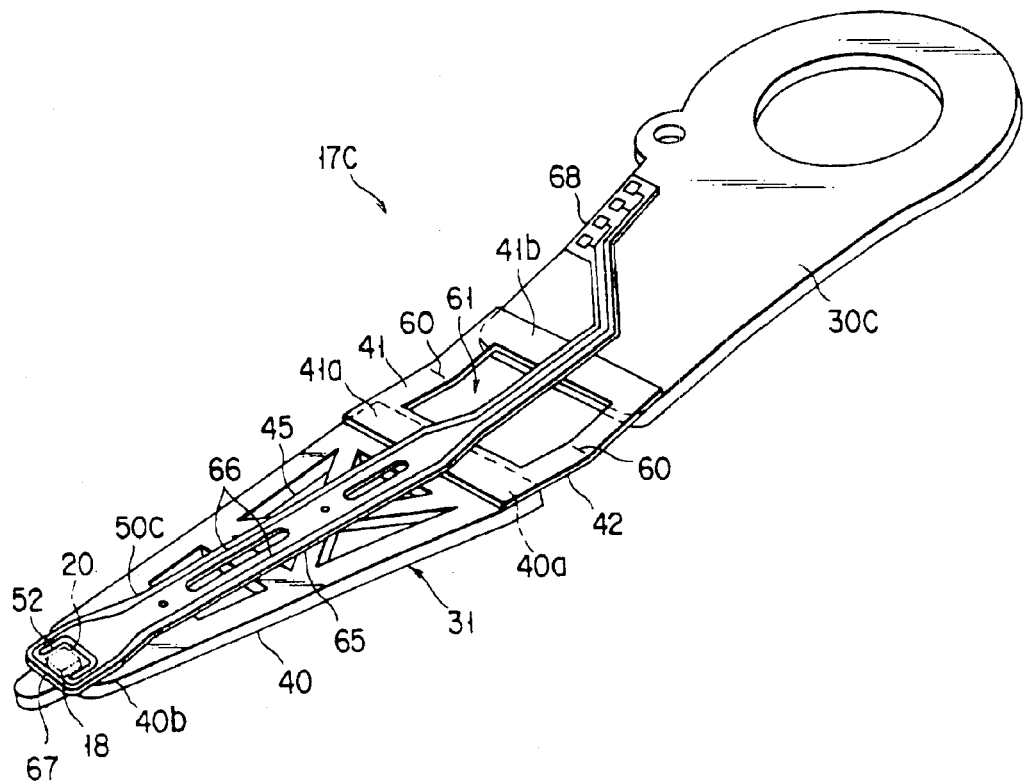
FIG. 6 is a perspective view of a suspension for disc drive according to a fourth embodiment of the invention.

FIG. 6 shows a suspension 17C according to a fourth embodiment of the invention. The suspension 17C is provided with a base plate 30C of the so-called arm type (i.e., a base plate having an arm) and a flexure 50C which has a wiring board. The wired flexure 50C includes a metal substrate 65, such as a springy rolled stainless-steel sheet, an electric insulating layer formed on the surface of the substrate 65, and conductive lines 66 on the insulating layer. One end of each conductive line 66 is connected electrically to terminals 67 of a head portion 18, and the other end to terminals 68 on the base plate 30C. A part of a spring member 41 is formed having bent portions 60 and an aperture 61. For other arrangements, the fourth embodiment resembles the first embodiment, so that common reference numerals are used to designate portions that are common to the first and fourth embodiments, and a description of those portions is omitted. The arm of the arm-type base plate 30C may be made of: a light metal such as Ti, Al alloy, or the like (i.e., a metal lower in specific gravity than iron); a laminated member made up of Al and stainless steel; a synthetic resin; or fiber-reinforced plastics. By use of these materials, the weight can be as light as possible, and the frequency and vibration characteristics can be improved.

Figure 7:
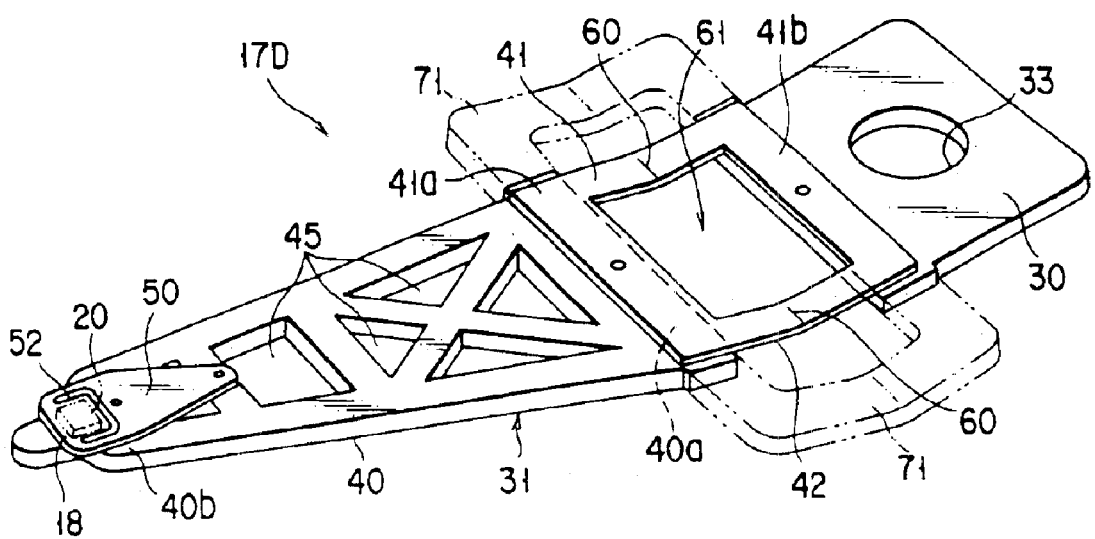
FIG. 7 is a perspective view of a suspension for disc drive according to a fifth embodiment of the invention.
Figure 8:
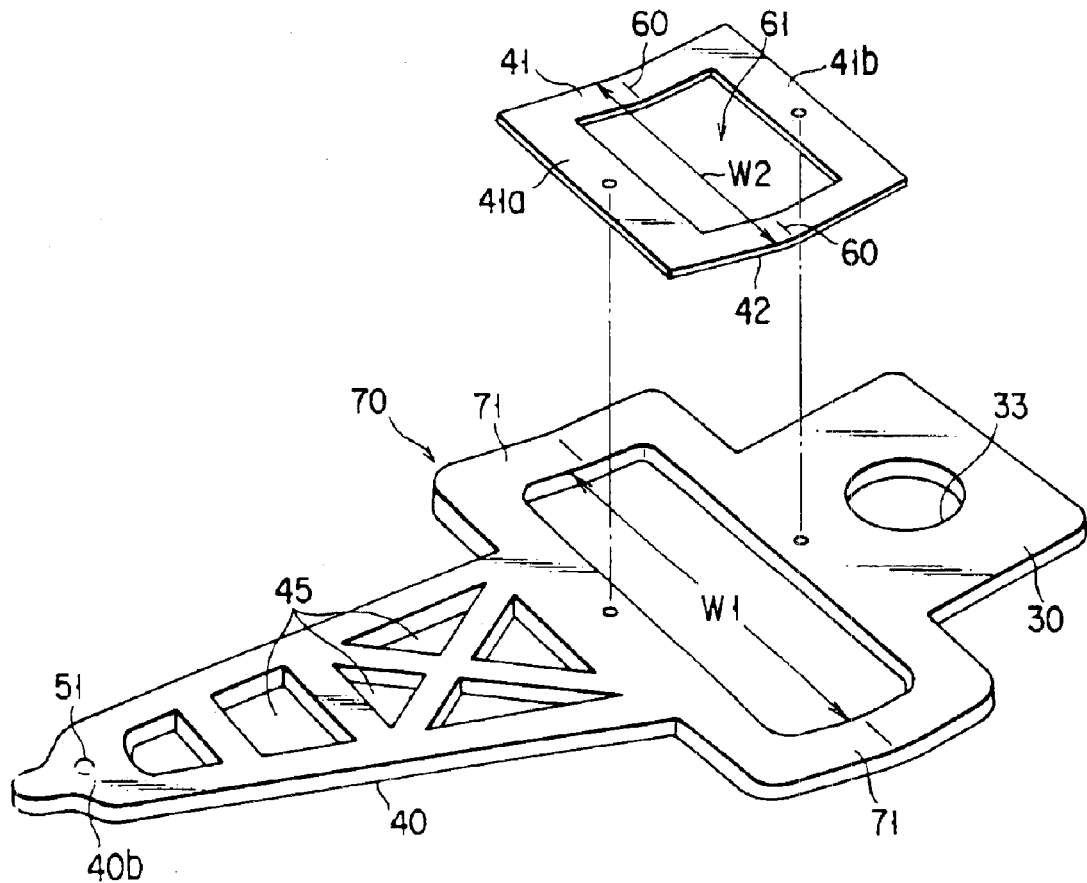
FIG. 8 is a perspective view showing a semi-finished suspension product and a spring member used in the suspension shown in FIG. 7.

FIG. 7 shows a suspension 17D according to a fifth embodiment of the invention. The suspension 17D is manufactured using a semi-finished suspension product 70, such as the one shown in FIG. 8. The semi-finished product 70 includes a base plate 30, a rigid body portion 40 of a load beam 31, and a pair of connecting portions 71, right and left, connecting the plate 30 and the body portion 40. The semi-finished product 70 is formed having the elements 30, 40 and 71 by press working, for example. The distance (W1) between the two connecting portions 71 is greater than the width (W2) of the spring member 41. When the spring member 41 is put on the base plate 30 and the rigid body portion 40, as shown in FIG. 7, the connecting portions 71 project individually from the opposite sides of the member 41.

The spring member 41 is put on both the rigid body portion 40 of the semi-finished suspension product 70 and the base plate 30, and is fixed to the plate 30 and the body portion 40 by laser welding or the like. Thereafter, the connecting portions 71 that project from the opposite sides of the spring member 41 are cut off from the body portion 40 and the base plate 30 by press working or the like.

According to this embodiment, the base plate 30 and the rigid body portion 40 are connected by means of the connecting portions 71 so that they form one integral part before the spring member 41 is fixed to the semi-finished suspension product 70. Thus, the base plate 30 and the body portion 40 can be handled with ease, and their relative positions can be regulated more accurately.

Figure 9:
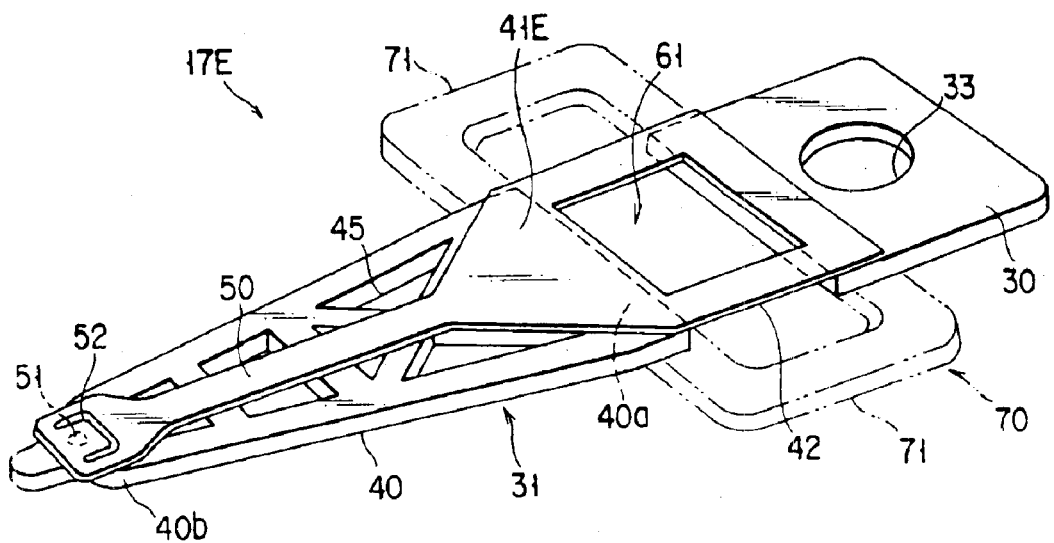
FIG. 9 is a perspective view of a suspension for disc drive according to a sixth embodiment of the invention.

FIG. 9 shows a suspension 17E according to a sixth embodiment of the invention. The suspension 17E has a spring portion 42 and a flexure 50 that are formed from one platelike spring member 41E. In this case, the components can be homogenized by forming the spring portion 42 and the flexure 50 integrally with each other. Further, a rigid body portion 40 and a base plate 30, like those of the semi-finished suspension product 70 according to the fifth embodiment, are connected by means of a pair of connecting portions 71. The distance (W1) between the two connecting portions 71 is greater than the width (W2) of the spring member 41E. After the spring member 41E is fixed to the semi-finished product 70, the connecting portions 71 that project individually from the opposite sides of the spring member 41E are cut off.

Figure 10:
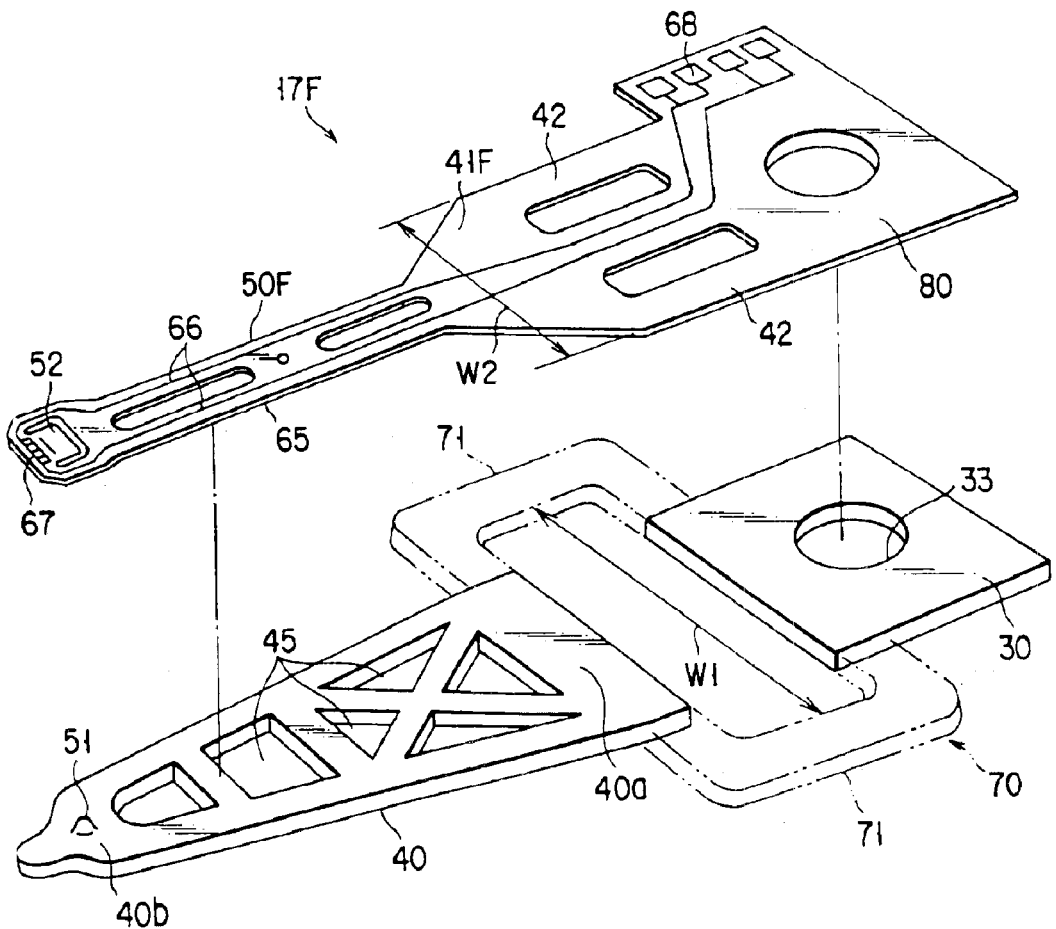
FIG. 10 is an exploded perspective view of a suspension for disc drive according to a seventh embodiment of the invention.

FIG. 10 shows a suspension 17F according to a seventh embodiment of the invention. In the suspension 17F, a spring portion 42 and a portion 80 to be put on a base plate 30 are formed integrally on a platelike spring member 41F that constitutes a flexure 5OF which has a wiring board. The wired flexure 5OF includes an electric insulating layer formed on the surface of a metal substrate 65, such as a springy rolled stainless-steel sheet, and conductive lines 66 on the insulating layer. One end of each conductive line 66 is connected electrically to terminals 67 of a head portion, and the other end to terminals 68 on the portion 80 that is put on the base plate 30. A body portion 40 and the base plate 30 according to this embodiment, like those of the semi-finished suspension product 70 according to the fifth embodiment, are connected by means of a pair of connecting portions 71. After the spring member 41F is fixed to the semi-finished product 70, the connecting portions 71 that project individually from the opposite sides of the spring member 41F are cut off.

Figure 11:
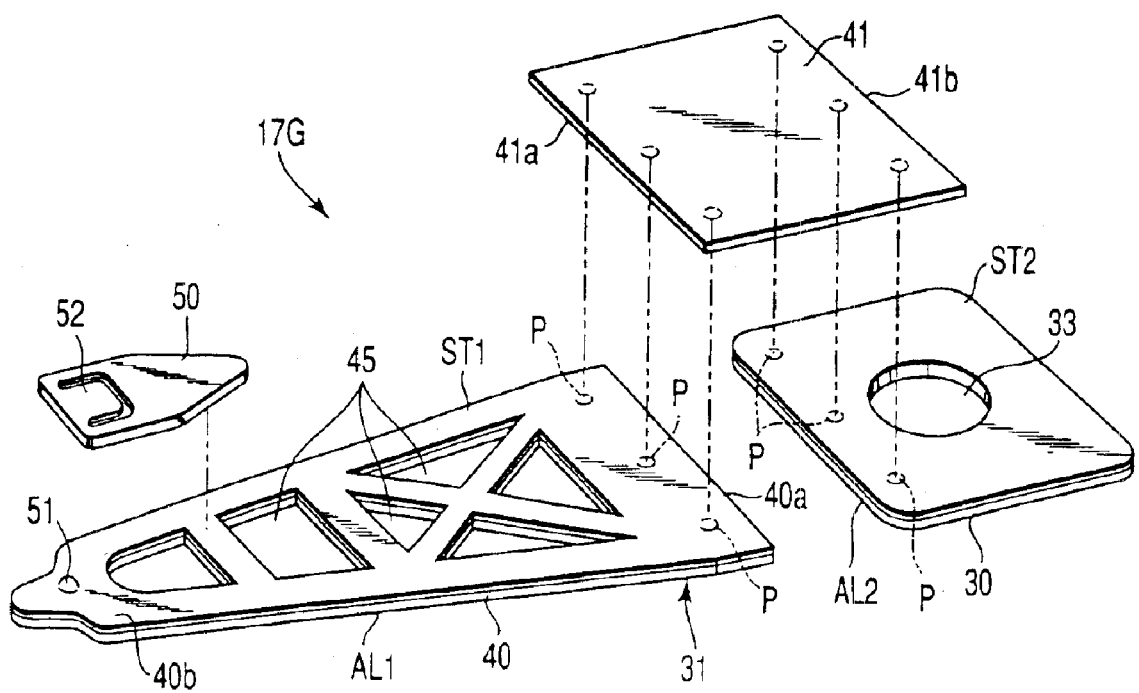
FIG. 11 is a perspective view of a suspension according to an eighth embodiment of the present invention.

FIG. 11 shows a suspension 17G of the eighth embodiment of the present invention. According to the eighth embodiment, the rigid body portion 40 of the load beam 31 is a laminated member (referred to as "SUS/Al Clad-beam" herein) made up of: a first plate AL1 formed of an aluminum alloy and having a thickness of 100 $\mu$m, and a second plate ST1 formed of a stainless steel and having a thickness of 30 $\mu$m. Likewise, the base plate 30 is a laminated member made up of: a first plate AL2 formed of a light alloy such as an aluminum alloy; and a second plate ST2 formed of a stainless steel. The spring member 41 is formed of a stainless steel. The spring member 41 is laser-welded to the stainless steel plate ST1 of the rigid body portion 40 and the stainless steel plate ST2 of the base plate 30. In FIG. 11, reference symbol "P" indicates the welded portions.

Figure 12:
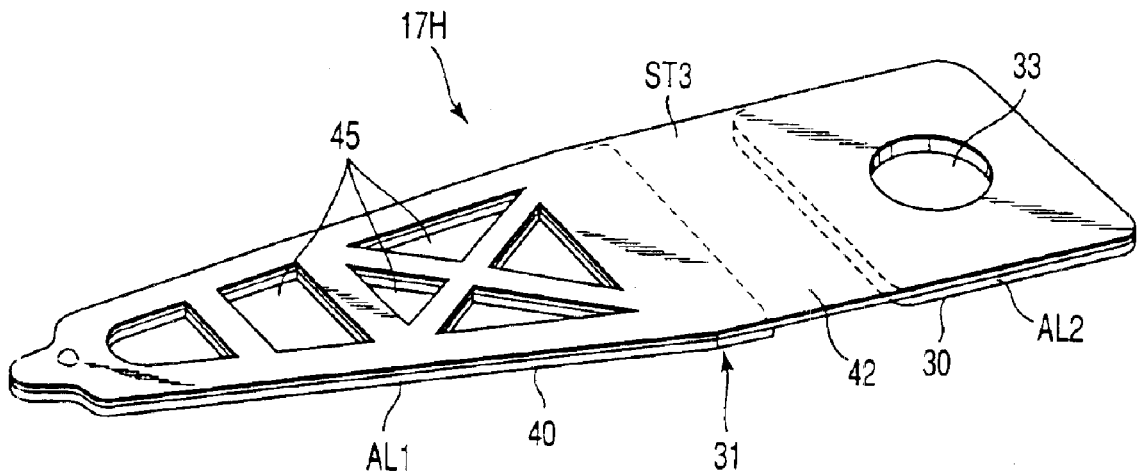
FIG. 12 is a perspective view of a suspension according to a ninth embodiment of the present invention.

FIG. 12 shows a suspension 17H of the ninth embodiment of the present invention. According to the ninth embodiment, the rigid body portion 40 of the load beam 31 is a laminated member (referred to as "SUS/Al Clad-beam" herein) made up of: a first plate ST3 formed of a stainless steel; and a second plate AL1 formed of an aluminum alloy. The spring member 42 is made by part of the first plate ST3. The base plate 30 is made of a second plate AL2 formed of a light alloy such as an aluminum alloy. This second plate AL2 is overlaid with the first plate ST3 of stainless steel.

Figure 13:
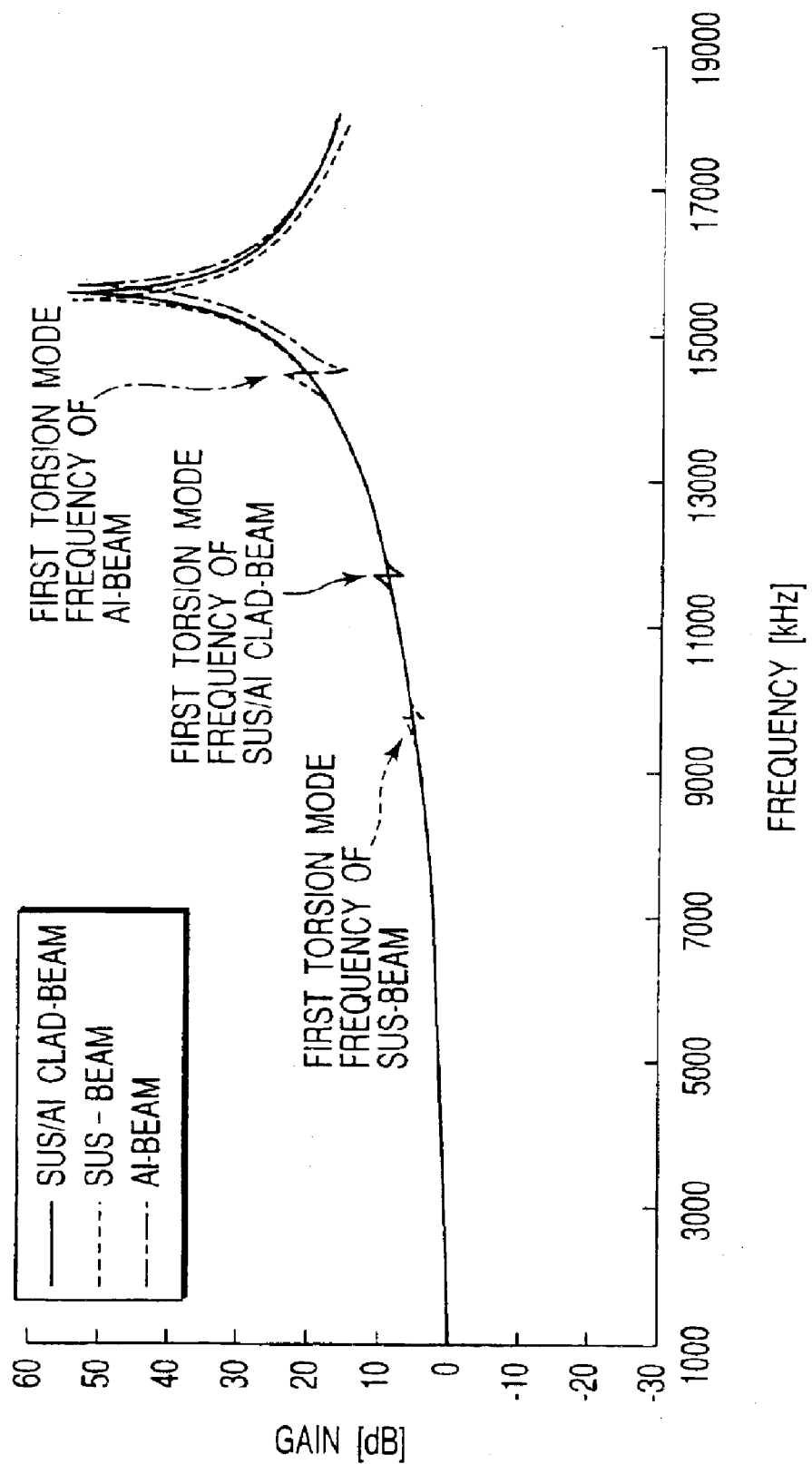
FIG. 13 is a graph showing resonance characteristics of a SUS/Al Clad-Beam, a SUS-Beam and Al-Beam.

FIG. 13 is a graph showing the first torsion mode resonance frequency. As shown in this graph, the first torsion mode resonance frequency of the SUS/Al Clad-beam is higher than that of the load beam (SUS-beam) formed only of stainless steel. In addition, the SUS/Al Clad-beam is lighter in weight than the SUS-beam whose thickness is 100 $\mu$m. Hence, the SUS/Al Clad-beam is reliable in frequency and vibration characteristics. As indicated by the one-dot-chain lines in FIG. 13, an Al-beam formed of aluminum alone and having a thickness of 160 $\mu$m may show satisfactory frequency characteristics. However, the Al-beam cannot be easily laser-welded to a flexure or base plate formed of stainless steel.

It is to be understood that the components of the suspension, such as the base plate, load beam, flexure, rigid body portion, spring member, etc., may be suitably modified without departing from the scope or spirit of the invention in carrying out the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:
    a base plate;
    a load beam attached to the base plate;
    a flexure attached to the load beam and adapted to be fitted with a head portion,
        the load beam comprising:
            a rigid body portion which is formed as a separate member from a base plate and to which the flexure is fixed, the rigid body portion being formed of stainless steel or a light metal; and
            a spring member, which connects the rigid body portion and the base plate together, which is formed as a separate member from the rigid body portion, and which is disposed on the same side as the flexure with respect to the base plate and the rigid body portion, the spring member being formed of stainless steel;
    an aperture formed in the spring member;
    spring portions which are formed on both sides of the aperture and which have a spring constant lower than that of the rigid body portion; and
    bent portions which are formed in the spring portions, respectively, by bending a longitudinally intermediate portion of the spring member.

2. A suspension for disc drive according to claim 1, wherein said rigid body portion of said load beam is formed of a light metal.

* * * * *